(12) United States Patent
Kwon et al.

(10) Patent No.: US 10,911,178 B2
(45) Date of Patent: *Feb. 2, 2021

(54) SYSTEM AND METHOD FOR BLIND DETECTION OF NUMEROLOGY

(71) Applicant: Samsung Electronics Co., Ltd., Gyeonggi-do (KR)

(72) Inventors: Hyukjoon Kwon, San Diego, CA (US); Niranjan Nayak Ratnakar, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/284,328

(22) Filed: Feb. 25, 2019

(65) Prior Publication Data

US 2019/0190647 A1  Jun. 20, 2019

Related U.S. Application Data

(63) Continuation of application No. 15/454,596, filed on Mar. 9, 2017, now Pat. No. 10,230,492.

(Continued)

(51) Int. Cl.
*H04L 1/00* (2006.01)
*H04L 27/26* (2006.01)
(Continued)

(52) U.S. Cl.
CPC .......... *H04L 1/0038* (2013.01); *H04L 7/0278* (2013.01); *H04L 27/2602* (2013.01); *H04L 27/2647* (2013.01); *H04L 27/2666* (2013.01); *H04L 27/2678* (2013.01); *H04W 88/02* (2013.01)

(58) Field of Classification Search
CPC ..................... H04W 74/00891; H04W 56/005
See application file for complete search history.

(56) References Cited

U.S. PATENT DOCUMENTS 7,305,056 B2  12/2007  Kroeger
7,430,257 B1   9/2008  Shattil
(Continued)

FOREIGN PATENT DOCUMENTS

WO   WO 2015/116866   6/2015

OTHER PUBLICATIONS

Zaidi, Ali et al., Waveform and Numerology to Support 5G Services and Requirements, IEEE Communications Magazine, Nov. 2016, pp. 90-98.

(Continued)

*Primary Examiner* — Wen W Huang
(74) *Attorney, Agent, or Firm* — The Farrell Law Firm, P.C.

(57) ABSTRACT

Systems and methods for blind detection of a numerology of a received signal are described. In one aspect, a method is provided for a user equipment (UE) to blindly detect the numerology of a received signal. The method includes correlating cyclic prefix (CP) signals in the received signal in the time domain based on a plurality of hypotheses of subcarrier spacing (SCS) and determining a numerology of the received signal for a corresponding hypothesis of SCS of the plurality of hypotheses based on the correlated CP signals.

18 Claims, 9 Drawing Sheets

Related U.S. Application Data

(60) Provisional application No. 62/442,264, filed on Jan. 4, 2017.

(51) Int. Cl.
*H04L 7/027* (2006.01)
*H04W 88/02* (2009.01)

(56) References Cited

U.S. PATENT DOCUMENTS

| | | | |
|---|---|---|---|
| 8,611,481 B2 | 12/2013 | Pitkanen | |
| 8,787,245 B2 | 7/2014 | Seo et al. | |
| 9,282,506 B2 | 3/2016 | Berggren | |
| 2006/0194533 A1 | 8/2006 | Robinson | |
| 2007/0064669 A1* | 3/2007 | Classon | H04L 1/1822 370/347 |
| 2007/0253319 A1 | 11/2007 | Jansen | |
| 2007/0254594 A1 | 11/2007 | Jansen | |
| 2009/0074100 A1* | 3/2009 | Bae | H04L 25/0216 375/267 |
| 2009/0080543 A1 | 3/2009 | Azizi | |
| 2010/0290569 A1 | 11/2010 | Bury | |
| 2011/0034168 A1* | 2/2011 | Lindoff | H04J 11/0086 455/434 |
| 2011/0080963 A1* | 4/2011 | Kim | H04L 1/0072 375/260 |
| 2011/0085589 A1 | 4/2011 | Filipovic | |
| 2011/0317750 A1 | 12/2011 | Chen | |
| 2013/0022090 A1 | 1/2013 | Weng et al. | |
| 2016/0192398 A1 | 6/2016 | Wang | |
| 2016/0352551 A1* | 12/2016 | Zhang | H04L 5/0007 |
| 2017/0104643 A1* | 4/2017 | Zhao | H04L 43/028 |
| 2017/0215170 A1* | 7/2017 | Islam | H04L 5/0053 |
| 2018/0206246 A1* | 7/2018 | Zhang | H04W 72/085 |
| 2019/0208481 A1* | 7/2019 | Tang | H04W 56/001 |
| 2020/0028726 A1* | 1/2020 | Karlsson | H04L 27/2666 |

OTHER PUBLICATIONS

Reference Numerology for NR, 3GPP TSG RAN WG1 Meeting #86bis, Lisbon, Portugal, Oct. 10-14, 2016, 6 pages.
Discussion on Initial Blind Acquisition, 3GPP TSG RAN WG1 Meeting #87, Reno, USA, Nov. 14-18, 2016, 4 pages.
Sync numerology considerations below 6GHz, 3GPP TSG RAN WG1 Meeting #87, Reno, USA, Nov. 14-18, 2016, 4 pages.
UE capability to process multiple numerologies, 3GPP TSG RAN WG1 Meeting #87, Reno, USA, Nov. 14-18, 2016, 3 pages.
Numerology for NR synchronization signal, 3GPP TSG RAN WG1 Meeting #87, Reno, USA, Nov. 14-18, 2016, 3 pages.
Performance of eMBB Receiver with Blind Detection of URLLC, 3GPP TSG RAN WG1 Meeting #87, Reno, USA, Nov. 14-18, 2016, 5 pages.
On blind detection of downlink control channels, 3GPP TSG RAN WG1 Meeting #87, Reno, USA, Nov. 14-18, 2016, 2 pages.
New SID Proposal: Study on New Radio Access Technology, 3GPP TSG RAN WG1 Meeting #71, Goteborg, Sweden, Mar. 7-10, 2016, 8 pages.
Study on New Radio (NR) Access Technology Physical Layer Aspects, 3GPP TR 38.802 V0.3.1, Nov. 2016, 58 pages.
Discussion on the options in NR design, 3GPP TSG RAN WG1 Meeting #87, Reno, USA, Nov. 14-18, 2016, 3 pages.
Discussion on the term "eMBB usage", "URLLC usage" and "mMTC usage" in study item, 3GPP TSG RAN WG1 Meeting #87, Reno, USA, Nov. 14-18, 2016, 1 page.
Slot length aspects, 3GPP TSG RAN WG1 Meeting #87, Reno, USA, Nov. 14-18, 2016, 3 pages.
Guard band Considering Channel Bandwidth for Mixed Numerologies, 3GPP TSG RAN WG1 Meeting #87, Reno, USA, Nov. 14-18, 2016, 4 pages.
Initial access signal mapping and multiplexing for sub 6GHz, 3GPP TSG RAN WG1 Meeting #87, Reno, USA, Nov. 14-18, 2016, 5 pages.
Initial access procedure for sub6GHz, 3GPP TSG RAN WG1 Meeting #87, Reno, USA, Nov. 14-18, 2016, 3 pages.
Initial access procedure for over 6 GHz system, 3GPP TSG RAN WG1 Meeting #87, Reno, USA, Nov. 14-18, 2016, 4 pages.

\* cited by examiner

SYSTEM AND METHOD FOR BLIND DETECTION OF NUMEROLOGY

PRIORITY

This application is a Continuation Application of U.S. patent application Ser. No. 15/454,596, which was filed in the U.S. Patent and Trademark Office on Mar. 9, 2017, and claims priority under 35 U.S.C. § 119(e) to U.S. Provisional Patent Application No. 62/442,264, which was filed in the U.S. Patent and Trademark Office on Jan. 4, 2017, the content of each of which is incorporated herein by reference.

FIELD

The present disclosure relates generally to $3^{rd}$ Generation Partnership Project (3GPP) "New Radio Access Technology," often called "NR" (new radio), and more particularly, to the blind detection of multiple NR numerologies.

BACKGROUND

Next generation or "5G" telecommunications technology represents a giant leap forward in both requirements and resources. In terms of resources, it is expected that 5G may have access to frequency bands from under 6 GHz (where the current Long Term Evolution (LTE) frequency bands are) up to 100 GHz. In terms of requirements, three 5G categories are often discussed:

- enhanced mobile broadband (eMBB), requiring very high data rates and large bandwidths;
- Ultra-reliable low latency communications (URLLC), requiring very low latency, and very high reliability and availability; and
- Massive machine type communications (mMTC), requiring low bandwidth, high connectivity, enhanced coverage, and low energy consumption on the user end.

One aspect of the 5G technologies are the changes to the physical layer, in which, as mentioned above, the 5G technology is often referred to as NR. Numerology (i.e., waveform parameters, such as the cyclic prefix (CP) and subcarrier spacing) is presently a non-issue because, under LTE, there is only one numerology in which, for example, the subcarrier spacing (SCS) is always 15 kHz. In such a radio environment, it is a relatively simple task for a user equipment (UE) to roughly synchronize with the signal and, based on their preset mapping in the frequency domain, find the primary synchronization signals (PSSs) and secondary synchronization signals (SSSs) in the time domain to fully synchronize.

On the other hand, because of the range of 5G requirements, NR must have multiple numerologies in order to encompass the range of usage (from relatively low bandwidth, like mMTC, to extremely high bandwidth, like 4K video on eMBB) and possible frequency bands (from sub-6 GHz up to 100 GHz, which includes, for example, millimeter-wavelength bands at around 30 GHz). In practice, this means, for example, there may be multiple SCSs, such as, for example, 15 kHz, 30 kHz, and 60 kHz, of three different numerologies transmitting at the same time and on at least partially overlapping frequency bands.

Thus, a UE in 5G NR must be able to determine, isolate, and synchronize to more than one numerology—a new requirement for the UE.

SUMMARY

Accordingly, the present disclosure has been made to address at least the problems and/or disadvantages described herein and to provide at least the advantages described below.

According to an aspect of the present disclosure, a method for blind detection by a user equipment (UE) of one of possible multiple numerologies of a received signal is provided, including correlating cyclic prefix (CP) signals in the received signal in the time domain based on a plurality of hypotheses of subcarrier spacing (SCS); measuring power variation of the received signal in the frequency domain based on the plurality of hypotheses of SCS; and combining weighted results of a correlation of the CP signals in the time domain and the measured power variation in the frequency domain to determine a numerology of the received signal for a corresponding hypothesis of SCS of the plurality of hypotheses.

According to an aspect of the present disclosure, a method for blind detection of one of possible multiple numerologies of a received signal is provided to a user equipment (UE), including correlating cyclic prefix (CP) signals before a symbol and a copy of the CP signals at the end of the symbol in the received signal; accumulating, within a sliding window, a modulo operation of correlation values over time; and using the accumulated correlation values to determine the numerology of the received signal.

According to an aspect of the present disclosure, a method for blind detection of one of possible multiple numerologies of a received signal is provided to a user equipment (UE), including transforming samples of the received signal from the time domain to the frequency domain, wherein a number of samples is selected based on a subcarrier spacing (SCS) hypothesis; applying a power spectrum density (PSD) mask to the samples in a sliding window in the frequency domain, wherein the PSD mask is selected based on the SCS hypothesis; and identifying the numerology of the received signal by locating SCSs in the received signal through detecting blank spaces with the appropriate power signature.

According to an aspect of the present disclosure, an apparatus is provided, including one or more non-transitory computer-readable media; and at least one processor which, when executing instructions stored on one or more non-transitory computer readable media, performs the steps of correlating cyclic prefix (CP) signals in the received signal in the time domain based on a plurality of hypotheses of subcarrier spacing (SCS); measuring power variation of the received signal in the frequency domain based on the plurality of hypotheses of SCS; and combining weighted results of a correlation of the CP signals in the time domain and the measured power variation in the frequency domain to determine a numerology of the received signal for a corresponding hypothesis of SCS of the plurality of hypotheses.

According to an aspect of the present disclosure, a method of manufacturing a chipset, which includes at least one processor which, when executing instructions stored on one or more non-transitory computer readable media, performs the steps of correlating cyclic prefix (CP) signals in the received signal in the time domain based on a plurality of hypotheses of subcarrier spacing (SCS); measuring power variation of the received signal in the frequency domain based on the plurality of hypotheses of SCS; and combining weighted results of a correlation of the CP signals in the time domain and the measured power variation in the frequency domain to determine a numerology of the received signal for a corresponding hypothesis of SCS of the plurality of hypotheses; and the one or more non-transitory computer-readable media which store the instructions.

According to an aspect of the present disclosure, a method of testing an apparatus is provided, including testing whether the apparatus has at least one processor which, when executing instructions stored on one or more non-transitory computer readable media, performs the steps of correlating cyclic prefix (CP) signals in the received signal in the time domain based on a plurality of hypotheses of subcarrier spacing (SCS); measuring power variation of the received signal in the frequency domain based on the plurality of hypotheses of SCS; and combining weighted results of a correlation of the CP signals in the time domain and the measured power variation in the frequency domain to determine a numerology of the received signal for a corresponding hypothesis of SCS of the plurality of hypotheses; and testing whether the apparatus has the one or more non-transitory computer-readable media which store the instructions.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1A:
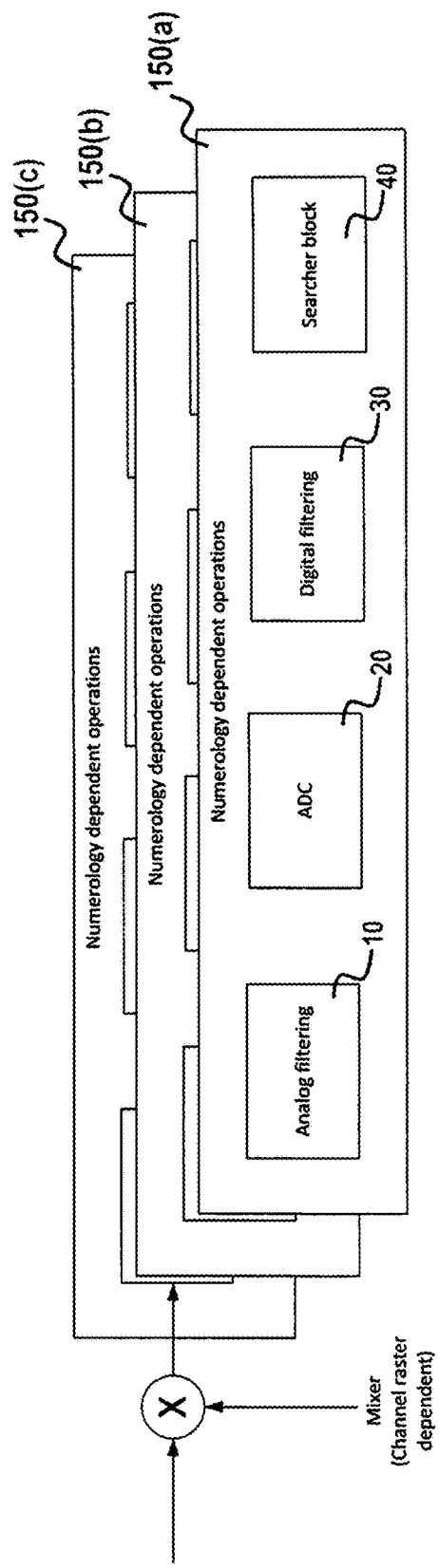
FIG. 1A illustrates an exemplary block diagram of a hardware system for blind decoding NR signals in a UE.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

As explained above, in a 5G NR environment, a UE will need to be able to determine, isolate, and at least distinguish more than one numerology. However, because different numerologies have different symbol sizes and different SCSs, present UEs would not be able to synchronize with its signal and thus read its intended communication.

Accordingly, the 5G NR UE needs to be able to at least find and distinguish its own numerology. There are a limited number of ways this may be accomplished: it could be preset (and thus the UE knows what to look for), the UE could be informed by higher-layer signaling (of known numerology), or the UE could perform blind detection.

Although not yet set as the standard, it is widely assumed that orthogonal frequency division modulation (OFDM) will be used for NR. In 3GPP TSG RAN WG1 Mtg #87 Tdoc R1-1612707 (draft 3GPP TR 38.802), which is incorporated herein in its entirety, it states that a UE has one reference numerology of 15 kHz in a given NR carrier which defines subframe duration for the given MR carrier, i.e., a subframe duration fixed to 1 ms. For a reference numerology with SCS $2^m \times 15$ kHz, where m is an integer, the subframe duration is exactly $1/2^m$ ms. The numerology with 15 kHz and scaled numerology with different SCS with the same CP overhead align at a symbol boundary every 1 ms in a NR carrier.

Embodiments of the present disclosure provide systems, methods, and apparatuses for a UE to blindly detect the numerology of signals in NR. Moreover, embodiments of the present disclosure estimate the actual SCS used for a frequency range. As mentioned above, the NR standard is being decided right now, so a concrete channel structure for NR is not finalized yet. For purposes of ease of explanation, embodiments of the present disclosure are described in reference to a conventional OFDM format where synch signals and non-synch (or data) signals are modulated with the same numerology, and it is also assumed that the numerology does not dynamically change, although semi-static change of numerologies is not excluded.

According to embodiments of the present disclosure, both time-domain (TD) and frequency-domain (FD) detection results are jointly considered, weighted, and combined to determine the numerology.

FIG. 1A illustrates an exemplary block diagram of a hardware system for blind decoding NR signals in a UE. In FIG. 1A, there is a reception chain of components for each possible numerology. After the received signal is mixed by the channel-raster-dependent mixer, copies of the mixed signal is input to each of reception chains 150(*a*), 150(*b*), and 150(*c*). In this case, the UE may only receive three possible numerologies; if there are more possible numerologies, more chains are needed. In each reception chain 150, the mixed signal is first filtered by an analog filter 10, converted from an analog signal to a digital signal by an analog-to-digital converter (ADC) 20, filtered by a digital filter 30, and finally searched for a particular numerology of all possible numerologies in a searcher block 40. During UE operations, these components are all continually working in parallel in each numerology reception chain 150.

Figure 1B:
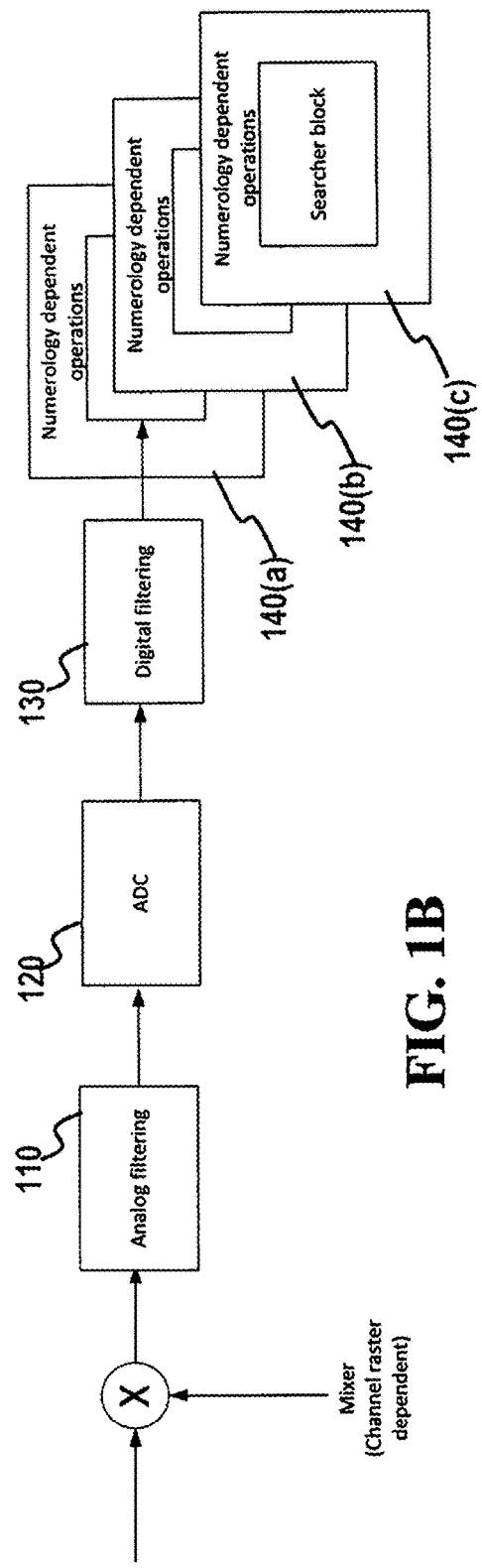
FIG. 1B illustrates an exemplary block diagram of another hardware system for blind decoding NR signals in a UE.

FIG. 1B illustrates an exemplary block diagram of another hardware system for blind decoding NR signals in a UE. In FIG. 1B, the system uses less hardware than in FIG. 1A, but still has duplication. More specifically, there is only a single reception chain, so after the received signal is mixed by the channel-raster-dependent mixer, the mixed signal is filtered by an analog filter 110, converted from an analog signal to a digital signal by an ADC 120, which is then filtered by a digital filter 130. However, in the system of FIG. 1B, the last block in the reception chain, the searcher block 140 is duplicated for each possible numerology, i.e., searcher block 140(*a*) searches for one numerology, searcher block 140(*b*) searches for another numerology, etc. Like FIG. 1A, this assumes the UE may only receive three possible numerologies; if there are more possible numerologies, more searcher blocks 140 are needed.

Figure 2:
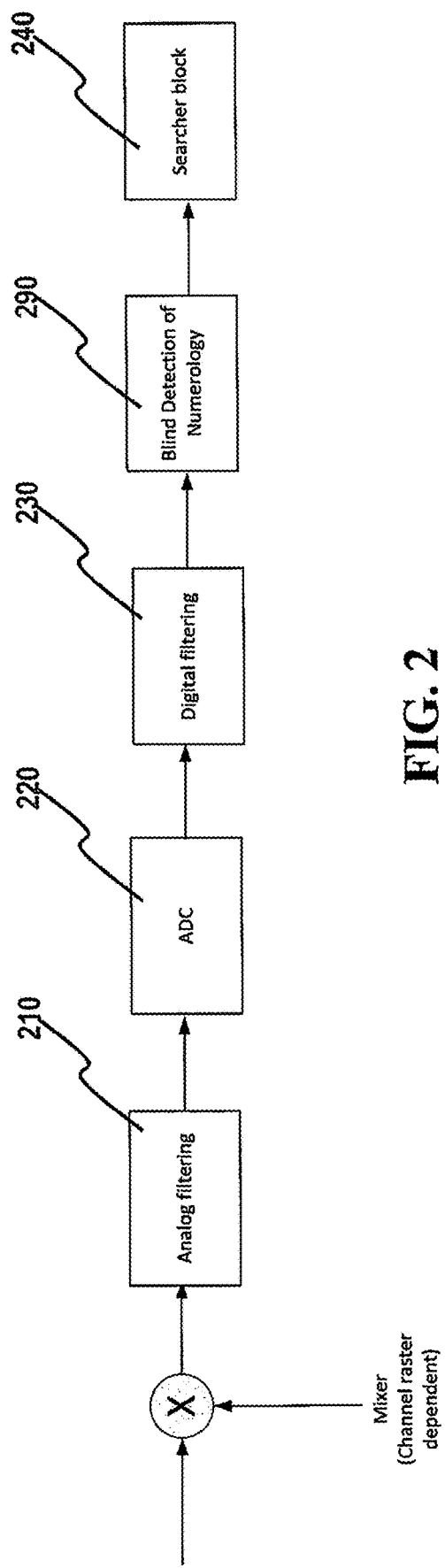
FIG. 2 illustrates an exemplary block diagram of another hardware system for blind decoding NR signals in a UE, according to an embodiment of the present disclosure.

FIG. 2 illustrates an exemplary block diagram of another hardware system for blind decoding NR signals in a UE, according to an embodiment of the present disclosure. In FIG. 2, there is no duplication of hardware, like in FIGS. 1A and 1B. Moreover, many of the hardware components of the present LTE UE may be simply re-used rather than introducing a complete new multiple numerology design. For example, the correlators and Fast Fourier Transforms (FFTs) already used for LTE synchronization can be used in embodiments of the present disclosure, as can be seen from the discussion below.

In FIG. 2, the system has only a single reception chain, so after the received signal is mixed by the channel-raster-dependent mixer, the mixed signal is first filtered by an analog filter 210, converted from an analog signal to a digital signal by an ADC 220, which is then filtered by a digital filter 230. A blind detection of numerology block 290 provides blind detection of multiple possible numerologies. The signal with the determined numerology that is provided by the blind detection of numerology block 290 is input to a searcher block 240 to provide searching for synchronization signals to perform full synchronization.

The embodiments of the present disclosure described herein are designed under the assumption that multiple SCSs are configured in a given frequency range—i.e., the UE knows the candidate SCSs such that the UE has to blindly detect the actual SCS out of the group of candidate SCSs. As mentioned above, it is also assumed that the numerology does not change dynamically symbol-by-symbol, although it can be changed semi-statically such that the given period, synch signals, and non-synch signals remain configured within the same numerology. Moreover, the expected synch signal structure for NR will use fixed channel bandwidth assignments for the synch signals, and a fixed number of subcarriers will be allocated to accommodate the synch signal in the frequency domain. Thus, these conditions are assumed herein as well.

In a method according to an embodiment of the present disclosure, first a correlation with the cyclic prefix (CP) is found in the time-domain (TD) and then SPS detection is performed in the frequency-domain (FD). The CP TD results and SPS FD results may be used alone, or jointly considered, weighted, and combined to more accurately determine the numerology.

I. CP Correlation in the Time Domain

The TD method exploits the fact that an OFDM signal structure includes a cyclic prefix (CP) and core parts, where the CP part is a copy of the last part of an OFDM symbol.

Figure 3:
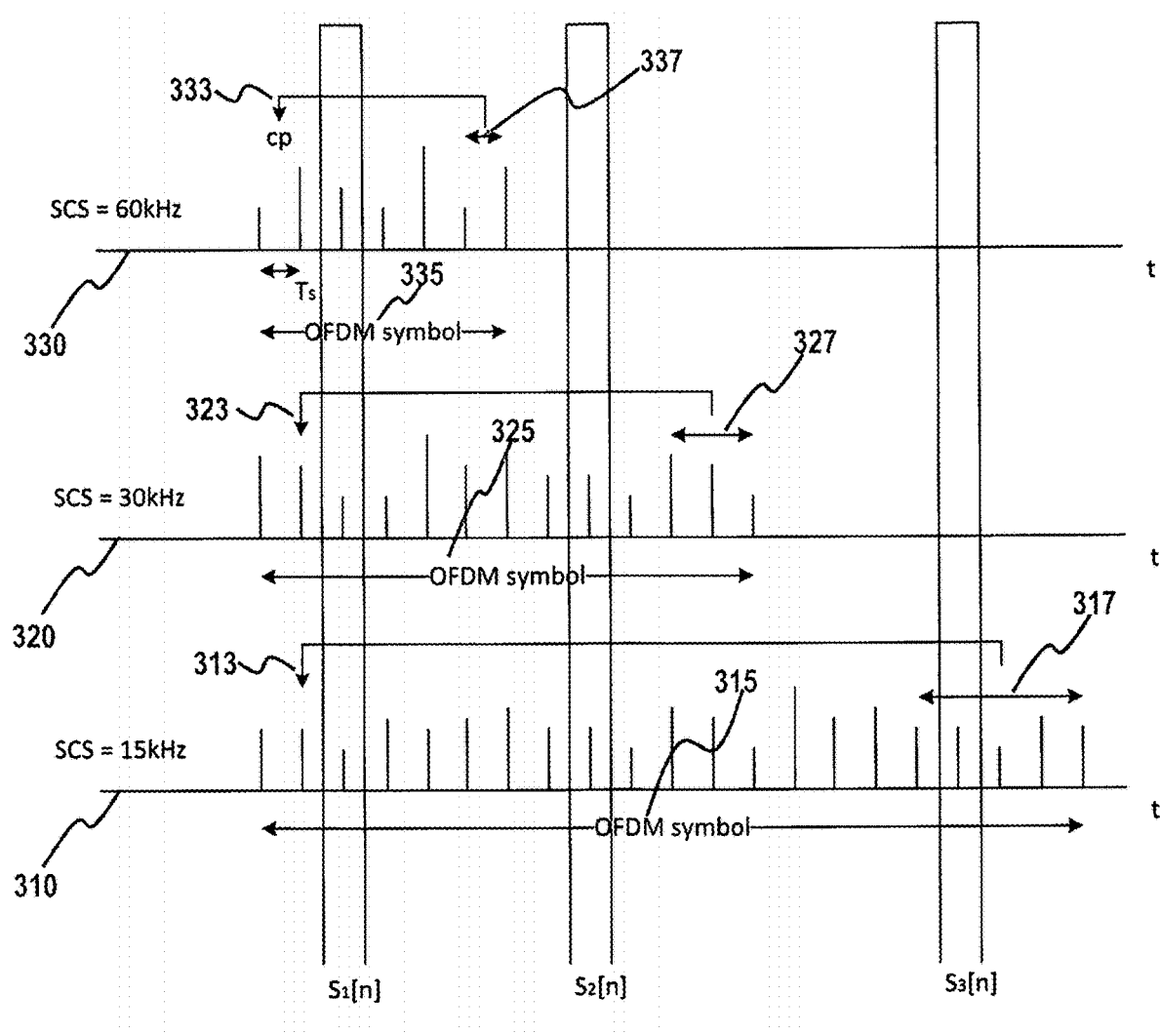
FIG. 3 illustrates an exemplary diagram of multiple numerologies, according to an embodiment of the present disclosure.

For example, FIG. 3 illustrates three different numerologies, each with a single OFDM signal. More specifically, timeline 310 illustrates a numerology with an SCS=15 kHz; timeline 320 illustrates a numerology with an SCS=30 kHz; and timeline 330 illustrates a numerology with an SCS=160 kHz.

In the numerology illustrated by timeline 310 with SCS=15 kHz, the span of OFDM symbol 315 is shown, its CP is indicated by 313, and the samples 317 at the end of the OFDM symbol 315 are the same as CP 313. In the numerology illustrated by timeline 320 with SCS=30 kHz, the span of OFDM symbol 325 is shown, its CP is indicated by 323, and the samples 327 at the end of the OFDM symbol 325 are the same as CP 323. Lastly, in the numerology illustrated by timeline 330 with SCS=60 kHz, the span of OFDM symbol 335 is shown, its CP is indicated by 333, and the samples 337 at the end of the OFDM symbol 335 are the same as CP 333.

It can be seen from FIG. 3 that the numerology being received can be identified by the correlation between the starting CP signals and repeating signals at the end of each OFDM symbol. In other words, the length of time between the starting CP and the ending repeating symbols identifies the numerology. Of course, the UE first needs to synchronize with the time when all CPs are transmitted at the same time, as shown by the matching times for CP 313, CP 323, and CP 333 in FIG. 3.

Because the numerology is not determined, the UE would begin at a fixed sampling rate (period $T_s$ in FIG. 3) and then may adjust the sampling rate during the searching stage, once the numerology is determined and the received signal is fully synchronized. Continuing with the example, in the time domain, there would be a correlation between times 333 and 337 for the numerology illustrated by timeline 330 (SCS=60 kHz), between times 323 and 327 for the numerology 320 illustrated by timeline (SCS=30 kHz), or between times 313 and 317 for the numerology illustrated by timeline 310 (SCS=15 kHz).

Figure 4:
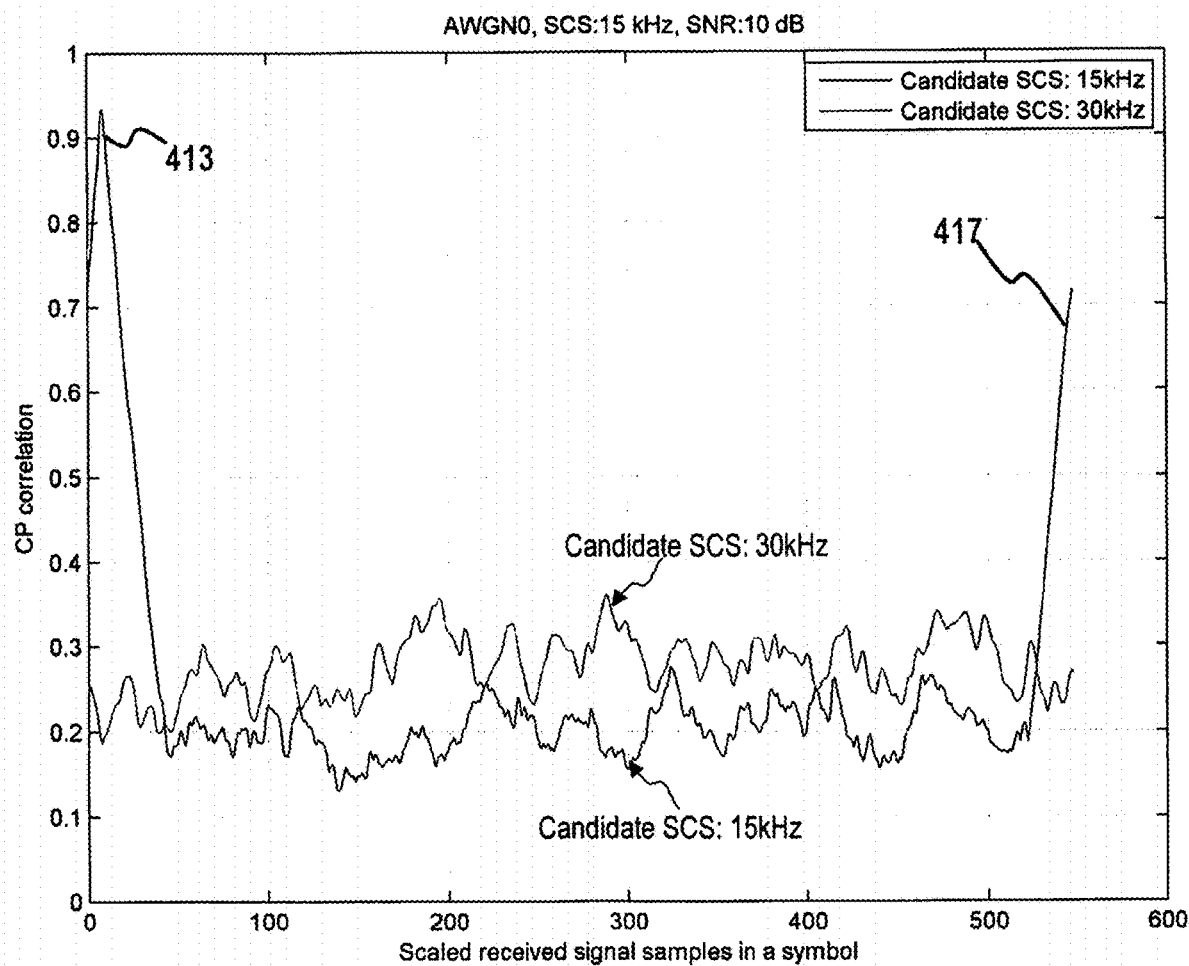
FIG. 4 illustrates an exemplary graph of CP correlation calculations for two possible numerology candidates, i.e., SCS=15 kHz and SCS=30 kHz, according to an embodiment of the present disclosure.

FIG. 4 shows the correlation calculations for two possible numerology candidates, i.e., SCS=15 kHz and SCS=30 kHz. The x-axis denotes the received signal samples per symbol under the modulo-operation (shown in Equations 1(a)-1(c) below), while the y-axis is the CP correlation. As can be seen by the high points 413 and 417 on the SCS=15 kHz candidate numerology line, the numerology being received is the SCS=15 kHz candidate numerology. Thus, it can be clearly observed that the correlation value is substantially larger when it is matched with the actual CP and repeating end signals.

According to an embodiment of the present disclosure, the CP correlation values are calculated as follows. Because there is no synchronization at this stage, the correlation values are added up with the modulo-operation per symbol period, not per synch signal period. In detail, the magnitude of the correlation of the CP for numerology m can be expressed as a sum of correlations, as shown in Equation (1)(a):

$$C_{CP}(m) = \sum_i \tilde{C}_{CP}(m, i) \quad (1)(a)$$

where $$i = n_s \bmod (N_{fft}(m) + N_{cp}(m)) \quad (1)(b)$$

m=candidate numerology
$n_s$=sample index $N_{fft}(m)$=the FFT sample size of the mth candidate numerology $N_{cp}(m)$=the CP sample size of the mth candidate numerology and the correlation for candidate numerology m at position i can be represented as Equation (1)(c):

$$\tilde{C}_{CP}(m, i) = \frac{\left|\sum_{k=1}^{N_{cp,m}} s[n_s + k]^* s[n_s + N_{fft}(m) + k]\right|}{\sqrt{\sum_{k=1}^{N_{cp,m}} |s[n_s + k]|^2} \sqrt{\sum_{k=1}^{N_{cp,m}} |s[n_s + N_{fft}(m) + k]|^2}} \quad (1)(c)$$

In this embodiment, the metric used is the average number of highest peaks over time. Turning back to FIG. 4, the two lines represent the values of $C_{cp}(m)$ for the two candidates as calculated above in an additive white Gaussian noise (AWGN) environment. The CP correlation is accumulated within the length of $N_{fft}(m)+N_{cp}(m)$ with the modulo operation as shown above in a sliding window.

In another embodiment of the present disclosure, the correlated samples are accumulated over the modulo operation, instead of the CP correlation values being accumulated over the modulo operation, as shown above in relation to Equations (1)(a)-(1)(c). More specifically, the correlated samples are accumulated over the modulo-operation as represented by Equation (2):

$$C_{CP}(m) = \frac{\left|\sum_{k=1}^{N_{cp,m}} \sum_i s[i + k]^* s[i + N_{fft}(m) + k]\right|}{\sqrt{\sum_{k=1}^{N_{cp,m}} \sum_i |s[i + k]|^2} \sqrt{\sum_{k=1}^{N_{cp,m}} \sum_i |s[i + N_{fft}(m) + k]|^2}} \quad (2)$$

Both methods in principle provide a way of correlate to a numerology using the CP length when the synch timing is not known.

The relative ratio $P_{TD}(m)$ of the detected variation in correlation $C_{CP}(m)$ can be used to provide a weighting in the time domain for each candidate numerology m, as represented by Equation (3):

$$P_{TD}(m) = \frac{C_{CP}(m)}{\sum_k C_{CP}(k)} \quad (3)$$

II. Finding SCSs in the Frequency Domain

The FD method exploits the fact that given a fixed synch channel bandwidth, there will be blank resources whose size is different per numerology. Thus, given a hypothesis (i.e., an assumption regarding which numerology is being used), a proper power spectral density (PSD) mask can be used pre-selected and used to extract the blank resources in the frequency domain. As such, the incoming time domain samples are transformed (via Fast Fourier Transform (FFT)) into the frequency domain. In order to reduce complexity, not every incoming sample need be converted into the frequency domain; instead, an appropriate periodicity can be selected, such as, for example, converting every CP length sample. Since FFT operations are performed over overlapped portions of the received signal, efficient computations of FFT could be made using previous computations.

Figure 5:
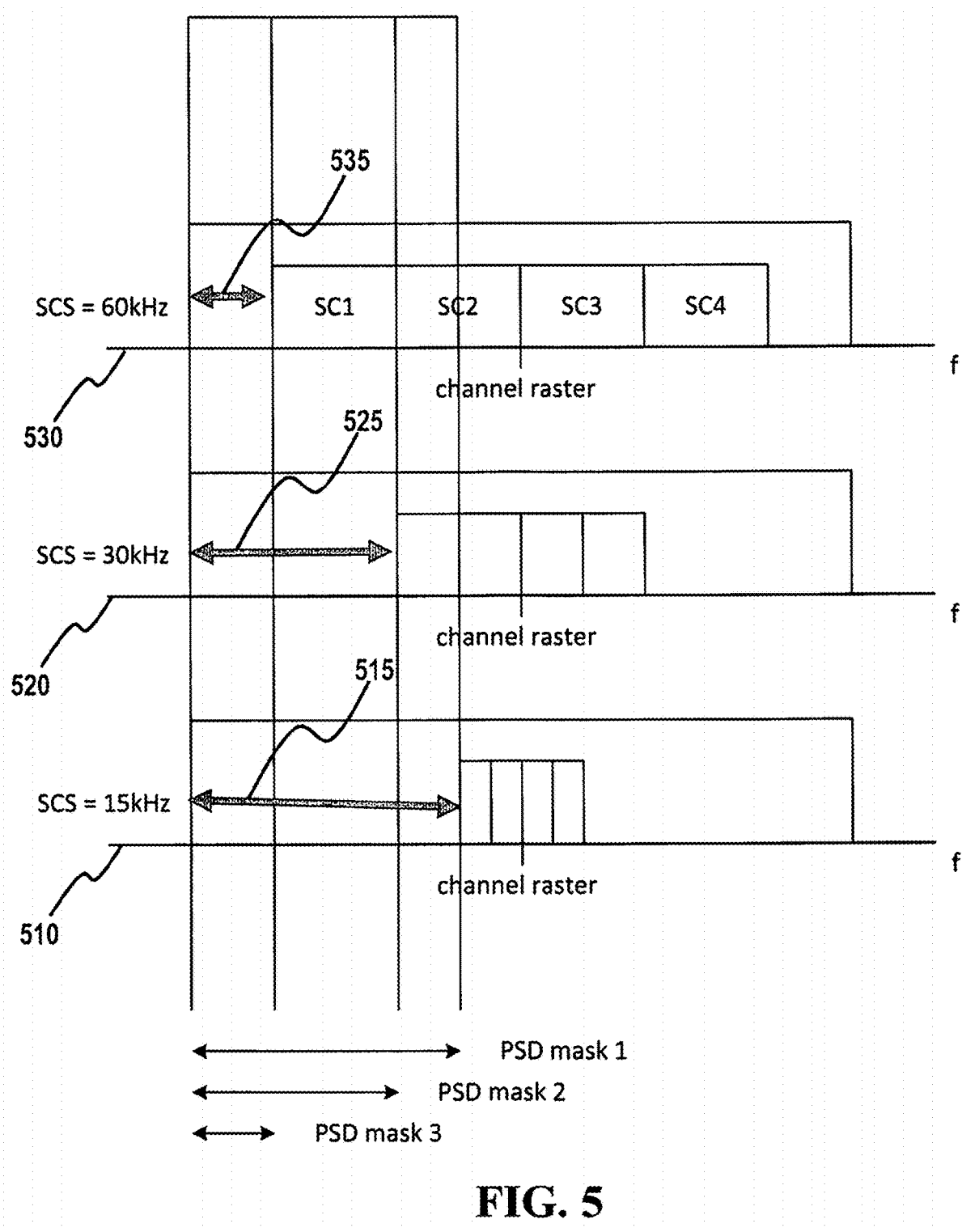
FIG. 5 illustrates an exemplary diagram of three different numerologies, each with four subcarriers, in the frequency domain, according to an embodiment of the present disclosure.

FIG. 5 illustrates three different numerologies, each with four subcarriers centered on the channel raster. More specifically, frequency axis 510 at the bottom illustrates a numerology with an SCS=15 kHz; frequency axis 520 in the middle illustrates a numerology with an SCS=30 kHz; and frequency axis 530 at the top illustrates a numerology with an SCS=160 kHz. In numerology 530 with SCS=60 kHz, its four subcarriers are labelled SC1, SC2, SC3, and SC4.

The numerology illustrated by frequency axis 510 with SCS=15 kHz has a span 515 of blank resources; the numerology illustrated by frequency axis 520 with SCS=30 kHz has a span 525 of blank resources; and the numerology illustrated by frequency axis 530 with SCS=60 kHz has a span 335 of blank resources. Accordingly, a proper power spectrum density (PSD) mask can identify a numerology by the size and disposition of its blank resources/SCSs. For example, PSD mask 3 shown at the bottom of FIG. 5 would match the blank resources 535 of the numerology illustrated by frequency axis 530 (SCS=60 kHz); PSD mask 2 would match the blank resources 525 of the numerology illustrated by frequency axis 520 (SCS=30 kHz); and PSD mask 1 would match the blank resources 515 of the numerology illustrated by frequency axis 510 (SCS=15 kHz). When the mask corresponds exactly to the blank resources, the PSD goes to near zero.

According to an embodiment of the present disclosure, a proper Fast Fourier Transform (FFT) size, i.e., the number of TD samples to transform (via FFT) into the frequency domain, is chosen first when performing SCS FD detection. This number corresponds to the numerology one is seeking to match. Then, a corresponding PSD mask is applied to determine whether and/or how there is a match in the frequency domain.

Figure 6:
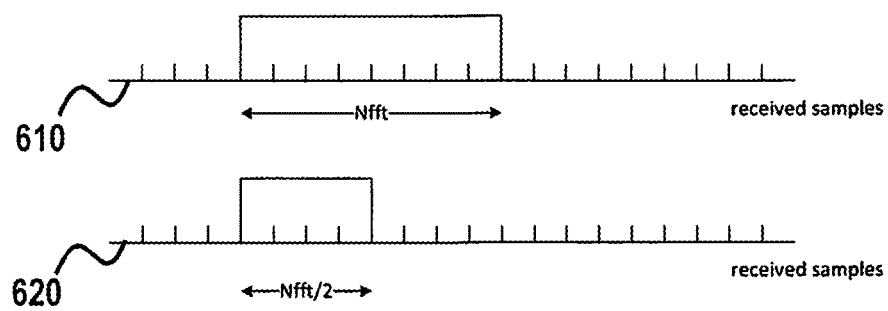
FIG. 6 illustrates an exemplary diagram of different number of time domain samples transformed into the frequency domain, according to an embodiment of the present disclosure.

For example, as shown in FIG. 6, $N_{fft}$ number of time domain samples are transformed into the frequency domain from timeline 610, while $N_{fft}/2$ number of time domain samples are transformed into the frequency domain from timeline 620 (which, for purposes of this example, may be the same as the samples on timeline 610).

FIGS. 7A-7B and 8A-8B are graphs where power measurement in the frequency domain is plotted over the measurement index, which is the length of the CP multiplied by the received signal samples, where the portion of samples in the sliding window are converted into the frequency domain. As such, there is a reverse peak when the actual SCS matches the hypothesis, as represented by the chosen number of TD samples per FFT.

Figure 7A:
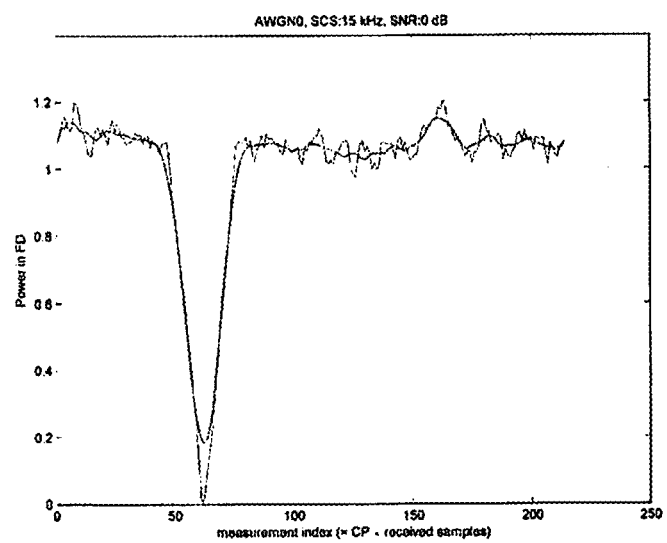
FIG. 7A illustrates an exemplary graph illustrating power measurement plots in the frequency domain of a numerology when an actual SCS matches a candidate SCS, according to an embodiment of the present disclosure.
Figure 7B:
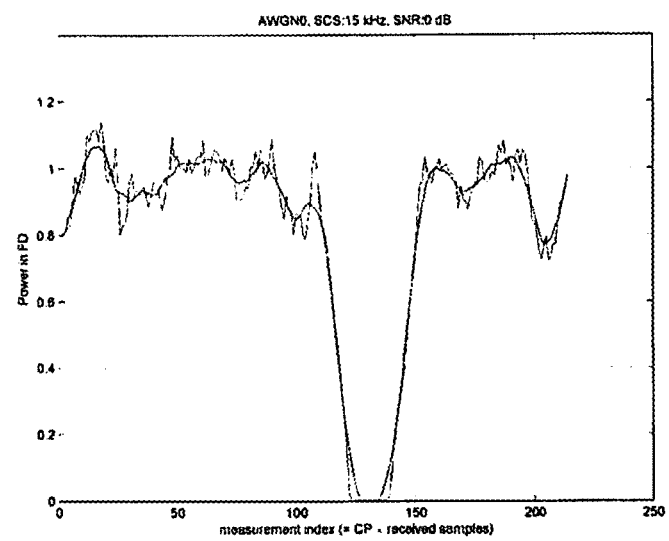
FIG. 7B illustrates an exemplary graph of power measurement plots in the frequency domain of a numerology when an actual SCS does not match a candidate SCS, according to an embodiment of the present disclosure.

In FIGS. 7A and 7B, the actual numerology to be detected is SCS=15 kHz. In FIG. 7A, the PSD mask for SCS=15 kHz is used, and thus the resulting valley in the plot is deep and sharp, because the PSD mask and blank resources are matched. In FIG. 7B, the PSD mask for SCS=30 kHz is used, and thus the resulting valley is broad and wide, because the PSD mask is smaller than the actual blank resources.

Figure 8A:
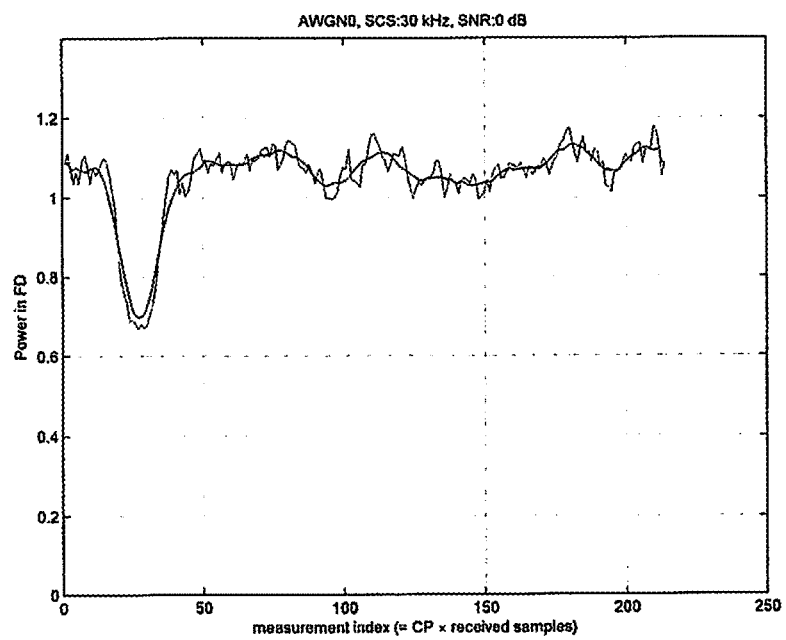
FIG. 8A illustrates another exemplary graph of power measurement plots in the frequency domain of a numerology when an actual SCS does not match a candidate SCS, according to an embodiment of the present disclosure.
Figure 8B:
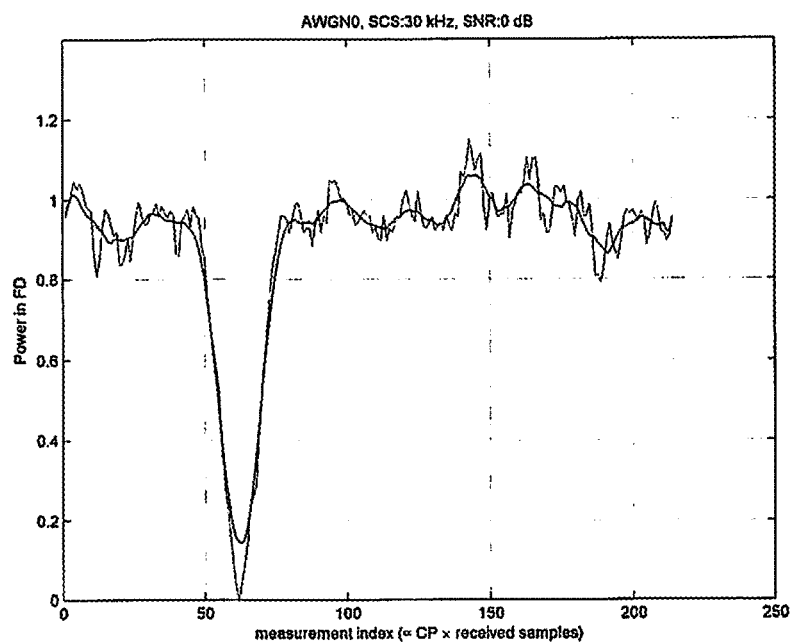
FIG. 8B illustrates another exemplary graph of power measurement plots in the frequency domain of a numerology when an actual SCS matches a candidate SCS, according to an embodiment of the present disclosure.

In FIGS. 8A and 8B, the actual numerology to be detected is SCS=30 kHz. In FIG. 8A, the PSD mask for SCS=15 kHz is used, and thus the resulting valley is just a shallow dip because the PSD mask is so much wider than the actual size of blank resources. In FIG. 8B, the PSD mask for SCS=30 kHz is used, and thus the resulting valley is deep and sharp, because the PSD mask and blank resources are matched.

Other tools for identifying candidate numerologies by detecting power variations over a sliding window of samples are known to one of ordinary skill in the art and include, but are not limited to, the coefficient of variation, as shown in Equation (4):

$$C_v = \sigma/\mu \quad (4)$$

the kurtosis, as shown in Equation (5):

$$Kurt[X] = \frac{E[(X-\mu)^4]}{(E[(X-\mu)^2])^2} \quad (5)$$

or skewness, as shown in Equation (6):

$$\gamma_1 = \frac{E[(X-\mu)^3]}{(E[(X-\mu)^2])^{3/2}} \quad (6)$$

Similar to ratio $C_{CP}$ (m) in Equation (3) above, the relative ratio of the detected power variation in the frequency domain $P_{FD}(m)$ can be used to provide a weighting for each candidate numerology m, as represented by Equation (7):

$$P_{FD}(m) = \frac{C_v(m)}{\sum_k C_v(k)} \quad (7)$$

where $C_v(m)$ is the coefficient of variation for the mth candidate numerology.

III. Joint CP TD Correlation and SCS FD Detection

Both CP correlation in the time domain and SCS detection in the frequency domain can be combined to further increase the accuracy of determining the correct numerology.

For example, both $P_{TD}(m)$ from Equation (3) and $P_{FD}(m)$ from Equation (7) can be used to provide a combined weighting for each candidate numerology m. Moreover, as CP TD correlation and SCS FD measurements are accumulated over time, their accuracy increases.

As described in detail above, this disclosure provides, inter alia, blind detection methods for UEs in possible 5G NR environments, including (1) using cyclic prefix correlation in the time domain to estimate received numerologies; (2) determining SCS locations in the frequency domain in order to estimate received numerologies; and/or (3) combining the two methods, either by weighting or other means, to determine received numerologies.

Figure 9:
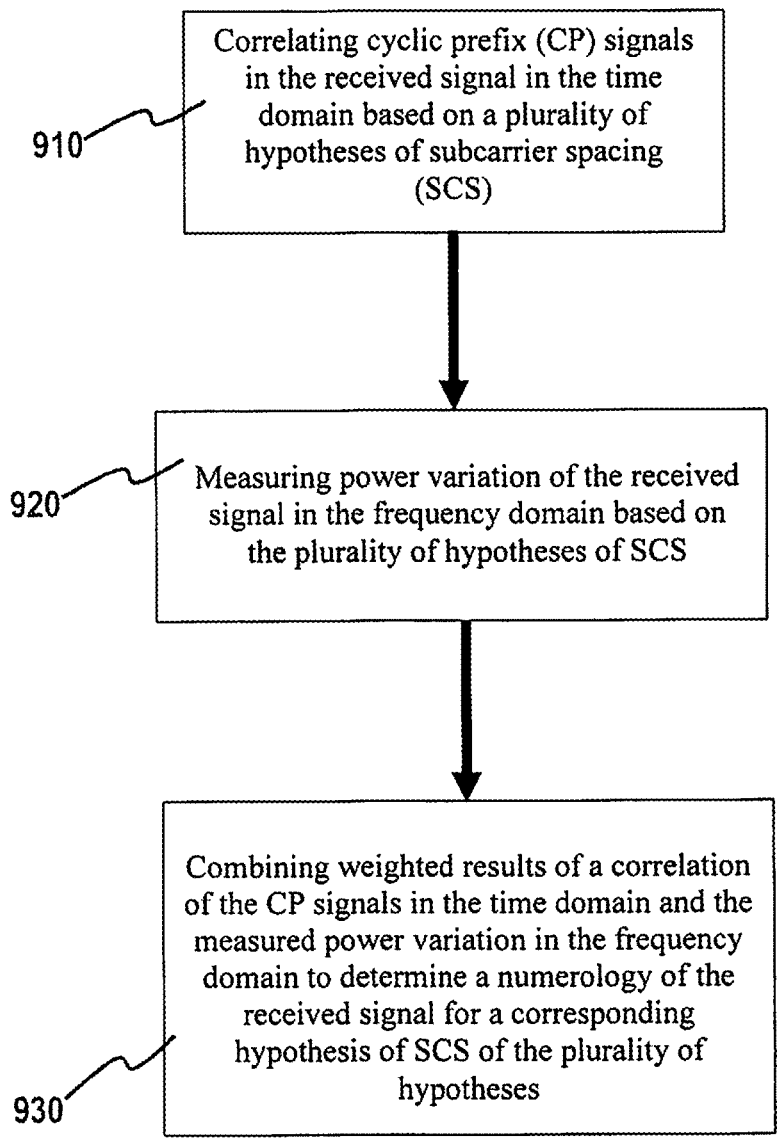
FIG. 9 illustrates an exemplary flowchart for blind detection of numerology, according to an embodiment of the present disclosure.

FIG. 9 illustrates an exemplary flowchart for blind detection of numerology according to an embodiment of the present disclosure. In 910, cyclic prefix (CP) signals in the received signal are correlated in the time domain based on a plurality of hypotheses of subcarrier spacing (SCS). In 920, the power variation of the received signal is measured in the frequency domain based on the plurality of hypotheses of SCS. In 930, combining weighted results of a correlation of the CP signals in the time domain and the measured power variation in the frequency domain to determine a numerology of the received signal for a corresponding hypothesis of SCS of the plurality of hypotheses.

Although embodiments herein are discussed having SCSs of 15 kHz, 30 kHz, and 60 kHz, the present disclosure is not limited thereto, and can include larger and smaller SCSs, such as 240 kHz and 480 kHz. As would be understood by one of ordinary skill in the art, the details and SCS sizes are still being discussed and determined, and thus the present disclosure is intended to apply to any SCSs which may be determined for usage.

Figure 10:
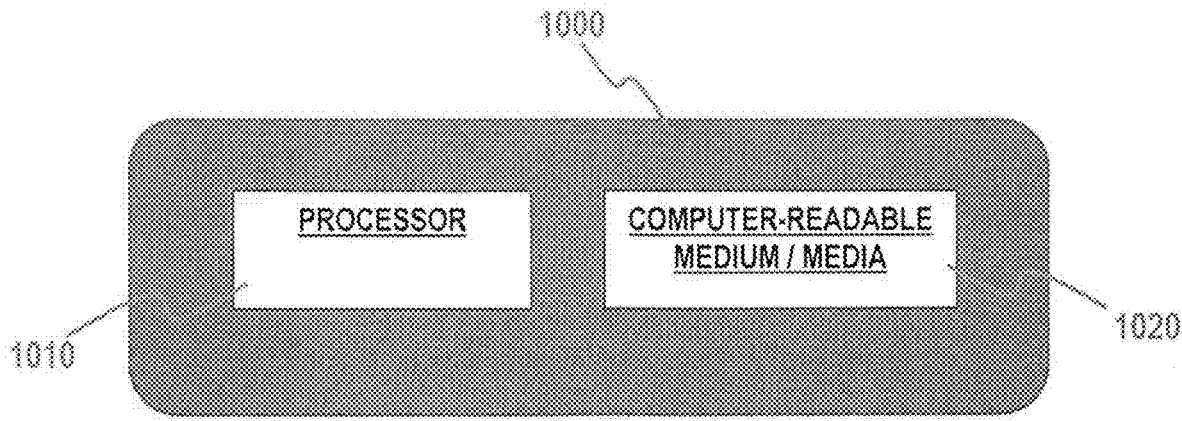
FIG. 10 illustrates an exemplary diagram of the present apparatus, according to an embodiment of the present disclosure.

FIG. 10 illustrates an exemplary diagram of the present apparatus, according to one embodiment. An apparatus 1000 includes at least one processor 1010 and one or more non-transitory computer readable media 1020. The at least one processor 1010, when executing instructions stored on the one or more non-transitory computer readable media 1020, performs the steps of correlating cyclic prefix (CP) locations in the received signal in the time domain based on a hypothesis of subcarrier spacing (SCS); detecting SCS of the received signal in the frequency domain by measuring power variation in the frequency domain and detecting empty resources based on a hypothesis of SCS; and combining weighted results of the CP correlation in the time domain and the SCS detection in the frequency domain to determine a numerology of the received signal. Moreover, the one or more non-transitory computer-readable media 1020 stores instructions for the at least one processor 1010 to perform those steps.

In another embodiment, the at least one processor 1010, when executing instructions stored on the one or more non-transitory computer readable media 1020, performs the steps of correlating a cyclic prefix (CP) location before a symbol and repeating samples at the end of the symbol resembling the CP in the received signal; accumulating, within a sliding window, a modulo operation of correlation values over time; and using the accumulated correlation values to determine the numerology of the received signal. Moreover, the one or more non-transitory computer-readable media 1020 stores instructions for the at least one processor 1010 to perform the steps of transforming samples of the received signal from the time domain to the frequency domain, wherein a number of samples is selected based on a subcarrier spacing (SCS) hypothesis; applying a power spectrum density (PSD) mask to the samples in a sliding window in the frequency domain, wherein the PSD mask is selected based on the SCS hypothesis; and identifying the numerology of the received signal by locating SCSs in the received signal through detecting blank spaces with the appropriate power signature.

Figure 11:
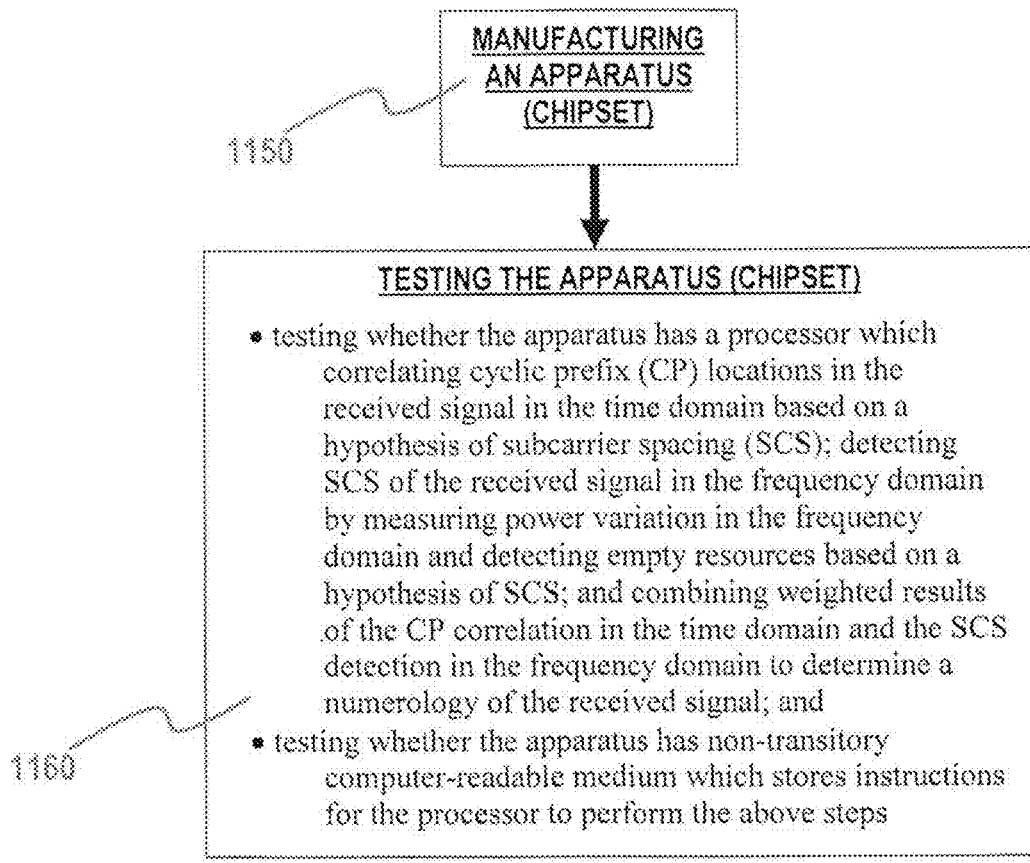
FIG. 11 illustrates an exemplary flowchart for manufacturing and testing the present apparatus, according to an embodiment of the present disclosure.

FIG. 11 illustrates an exemplary flowchart for manufacturing and testing the present apparatus, according to one embodiment.

At 1150, the apparatus (in this instance, a chipset) is manufactured, including at least one processor and one or more non-transitory computer-readable media. When executing instructions stored on the one or more non-transitory computer readable media, the at least one processor performs the steps of correlating cyclic prefix (CP) locations in the received signal in the time domain based on a hypothesis of subcarrier spacing (SCS); detecting SCS of the received signal in the frequency domain by measuring power variation in the frequency domain and detecting empty resources based on a hypothesis of SCS; and combining weighted results of the CP correlation in the time domain and the SCS detection in the frequency domain to determine a numerology of the received signal. The one or more non-transitory computer-readable media store instructions for the at least one processor to perform those steps.

At 1160, the apparatus (in this instance, a chipset) is tested. Testing 1160 includes testing whether the apparatus has at least one processor which, when executing instructions stored on one or more non-transitory computer readable media, performs the steps of correlating a cyclic prefix (CP) location before a symbol and repeating samples at the end of the symbol resembling the CP in the received signal; accumulating, within a sliding window, a modulo operation of correlation values over time; and using the accumulated correlation values to determine the numerology of the received signal; and testing whether the apparatus has the one or more non-transitory computer-readable media which store instructions for the at least one processor to perform the above steps.

In another embodiment, a chipset is manufactured, including at least one processor and one or more non-transitory computer-readable media. The at least one processor, when executing instructions stored on the one or more non-transitory computer readable media, performs the steps of transforming samples of the received signal from the time domain to the frequency domain, wherein a number of samples is selected based on a subcarrier spacing (SCS) hypothesis; applying a power spectrum density (PSD) mask to the samples in a sliding window in the frequency domain, wherein the PSD mask is selected based on the SCS hypothesis; and identifying the numerology of the received signal by locating SCSs in the received signal through detecting blank spaces with the appropriate power signature. Moreover, the one or more non-transitory computer-readable media stores instructions for the at least one processor to perform the above steps.

In this embodiment, the chipset may be tested by testing whether the apparatus has at least one processor which, when executing instructions stored on one or more non-transitory computer readable media, performs the steps of transforming samples of the received signal from the time domain to the frequency domain, wherein a number of samples is selected based on a subcarrier spacing (SCS) hypothesis; applying a power spectrum density (PSD) mask to the samples in a sliding window in the frequency domain, wherein the PSD mask is selected based on the SCS hypothesis; and identifying the numerology of the received signal by locating SCSs in the received signal through detecting blank spaces with the appropriate power signature; and testing whether the apparatus has the one or more non-transitory computer-readable media which store instructions for the at least one processor to perform the above steps.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for blind detection by a user equipment (UE) of one of possible multiple numerologies of a received signal, comprising:
   correlating cyclic prefix (CP) signals in the received signal in the time domain based on a plurality of hypotheses of subcarrier spacing (SCS);
   measuring a power variation of the received signal in the frequency domain based on the plurality of hypotheses; and
   determining a numerology of the received signal for a corresponding hypothesis of SCS of the plurality of hypotheses based on the correlated CP signals based on the measured power variation.

2. The method of claim 1, wherein correlating CP signals further comprises correlating CP signals before a symbol and a copy of the CP signals at the end of the symbol in the received signal.

3. The method of claim 2, further comprising accumulating, within a sliding window, a modulo operation over time of a result of the correlating.

4. The method of claim 3, wherein the result of the correlating comprises CP correlation values.

5. The method of claim 3, wherein the result of the correlating comprises correlated samples.

6. The method of claim 3, wherein determining the numerology further comprises using the accumulation from the accumulating to determine the numerology of the received signal.

7. The method of claim 1, further comprising applying a power spectrum density (PSD) mask to the samples in a sliding window in the frequency domain.

8. The method of claim 7, wherein determining the numerology of the received signal further comprises identifying the numerology of the received signal by locating SCSs in the received signal through detecting blank spaces with the appropriate power signature.

9. The method of claim 1, further comprising searching for synchronization signals for the numerology in order to synchronize with the received signal.

10. A system for blind detection by a user equipment (UE) of one of possible multiple numerologies of a received signal, comprising:
    a memory; and
    a processor configured to:
    correlate cyclic prefix (CP) signals in the received signal in the time domain based on a plurality of hypotheses of subcarrier spacing (SCS)
    measure a power variation of the received signal in the frequency domain based on a plurality of hypotheses of subcarrier spacing (SCS); and
    determine a numerology of the received signal for a corresponding hypothesis of SCS of the plurality of hypotheses based on the measured power variation.

11. The system of claim 10, wherein the processor is further configured to correlate CP signals further by correlating CP signals before a symbol and a copy of the CP signals at the end of the symbol in the received signal.

12. The system of claim 11, wherein the processor is further configured to accumulate, within a sliding window, a modulo operation over time of a result of the correlating.

13. The system of claim 12, wherein the result of the correlating comprises CP correlation values.

14. The system of claim 12, wherein the result of the correlating comprises correlated samples.

15. The system of claim 12, wherein the processor is further configured to determine the numerology by using the accumulation from the accumulating to determine the numerology of the received signal.

16. The system of claim 12, wherein the processor is further configured to apply a power spectrum density (PSD) mask to the samples in a sliding window in the frequency domain.

17. The system of claim 16, wherein the processor is further configured to determine the numerology of the received signal by identifying the numerology of the received signal by locating SCSs in the received signal through detecting blank spaces with the appropriate power signature.

18. The system of claim 10, wherein the processor is further configured to search for synchronization signals for the numerology in order to synchronize with the received signal.

* * * * *